Feb. 23, 1932. A. W. WOODWARD 1,846,240
VEHICLE WHEEL RIM
Filed May 15, 1928    2 Sheets-Sheet 1

Inventor
Alva W. Woodward

Attorney

Feb. 23, 1932.  A. W. WOODWARD  1,846,240
VEHICLE WHEEL RIM
Filed May 15, 1928  2 Sheets-Sheet 2
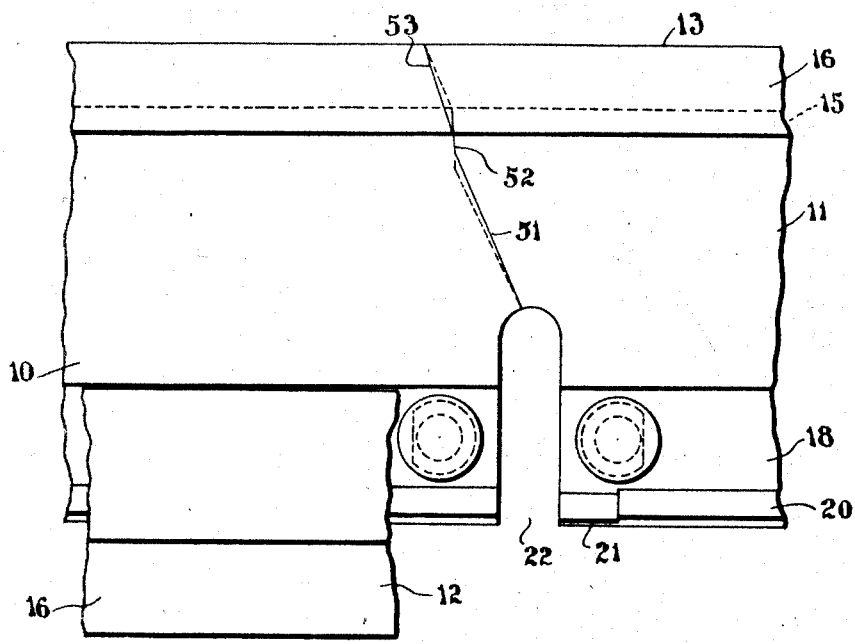
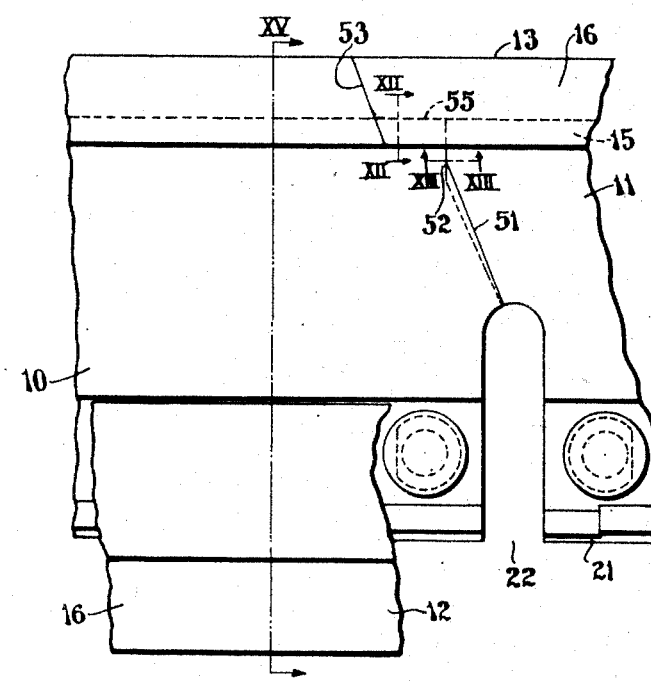
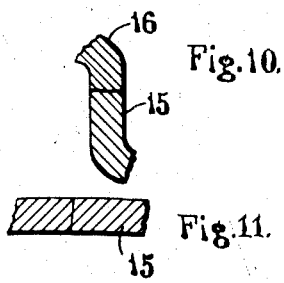
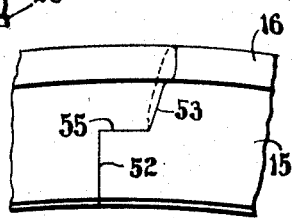
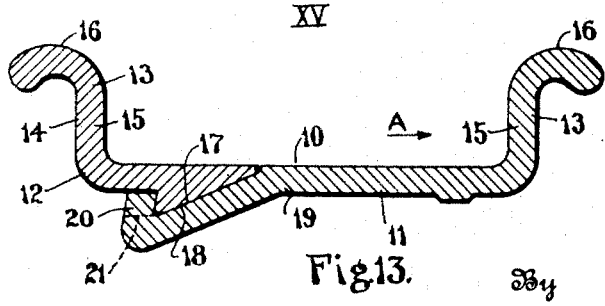
Inventor
Alva W. Woodward
Attorney Patented Feb. 23, 1932

1,846,240

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

VEHICLE WHEEL RIM

Application filed May 15, 1928. Serial No. 277,876.

My invention relates to vehicle wheel rims, and it has particular relation to rims of the aforesaid character embodying transversely split annular members which are associated operatively with endless side rings.

An object of the invention is to provide an improved transversely split rim member having abutting end surface portions of such configuration that the ends of the member will be maintained positively in their operative positions.

This invention practically obviates the difficulties heretofore encountered by providing a transversely split member having a portion of the split located in the base and sidewall thereof, which is disposed in a plane substantially intersecting the axis of the rim. Hence, the ends of the member have frictionally engaging portions which strongly oppose relative lateral movement of such ends. The split preferably is formed by a single shearing operation, in which it is necessary to form the circumferential portion of the split at an angle to the sidewall of the flange. Consequently the end portions of the rim bordering the circumferential part of the split do not positively oppose inward radial movement of one end of the rim with respect to the other. To offset this, the vertically disposed portion of the split in the sidewall is arcuated to provide a projection on one end of the rim which extends into a depression in the other end.

For a better understanding of the invention, reference may now be had to the accompanying drawings, forming a part of the specification, of which;

Figure 3 is a cross-sectional view, taken substantially along the line III—III of Figure 1;

Figure 4 is a cross-sectional view, taken substantially along the line IV—IV of Figure 1;

Figure 5 is a view taken substantially along the line V—V of Figure 1;

Figure 8 is a fragmentary plan view of a rim embodying another form of the invention;

Figure 9 is a fragmentary plan view of a rim embodying still another form of the invention;

Figure 10 is a cross-sectional view, taken substantially along the line XII—XII of Figure 9;

Figure 11 is a cross-sectional view, taken substantially along the line XIII—XIII of Figure 9;

Figure 12 is a fragmentary elevational view of the split in the flange, taken externally of the rim shown in Figure 9; and Figure 13 is a cross-sectional view, taken substantially along the line XV—XV of Figure 9.

Figure 1:
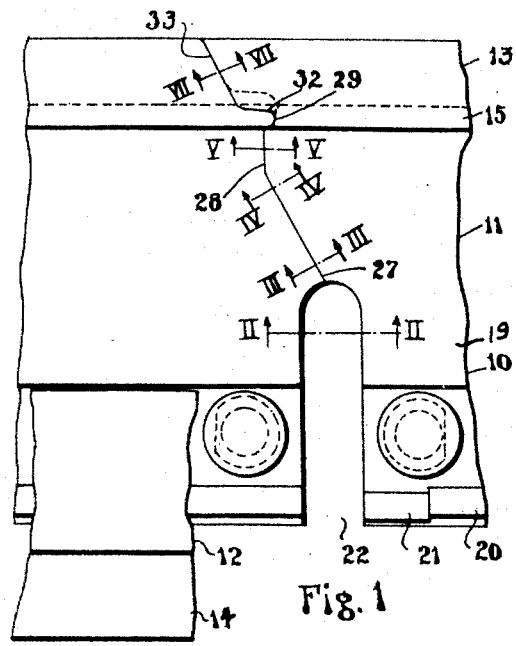
Figure 1 is a fragmentary plan view of a rim constructed according to a preferred form of the invention.
Figure 2:
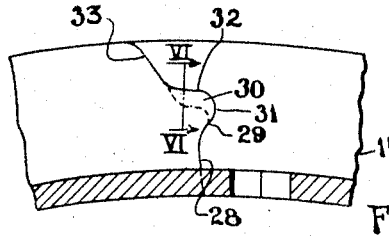
Figure 2 is a cross-sectional view, taken substantially along the line II—II of Figure 1.

A rim 10 employed in practicing the invention comprises a transversely split member 11 and an endless side ring 12, each having tire engaging flanges 13 and 14, respectively. As best shown by Figure 15, the flanges are provided with normally projecting sidewalls 15, which merge at their outer edge into arcuate portions 16. The members 11 and 12, in their operative positions, are interlocked by an inclined shoulder 17 formed on the inner periphery of the member 12, which abuts a flange 20 disposed around the outer edge of an inclined portion 18 projecting inwardly from an edge of a base 19 of the member 11. Separation of the members 11 and 12 is facilitated by a notch 21, formed in the flange 20, adjacent an opening 22 which is provided for a valve stem of an inner tube of a pneumatic tire casing (not shown). This notch provides an initial purchase for a suitable tool employed in forcing one end of the member 11 inwardly and laterally away from the ring 12, after which the aforesaid tool may be employed effectively at other points about the rim, until the members are completely separated.

Referring more particularly to Figure 1, the split in the member 11 comprises a diagonally directed portion 27 formed in the base 19, which communicates at one end with the valve stem opening 22 and extends oppositely therefrom toward the tire engaging flange 13. As shown by Figures 3 and 4, this portion 27 of the split is slightly undercut at an angle which progressively increases as the split approaches the tire engaging flange 13. This variation of the angle of undercut results from cutting in a diagonal direction through a circumferentially curved section of the member.

Adjacent the flange 13 the split extends, as indicated at 28, into the sidewall 14 thereof in a substantially radial plane, parallel to the axis of the rim. The radially inner edge portion of the flange 13 is provided with an arcuate portion 29, embodying a continuation of the split 27 beyond the portion 28, which projects toward the plane of the valve stem opening 22 in overhanging relation to the portion 28. Thus, it will be observed that a radial plane substantially coinciding with the portion 28 of the split will intersect the arcuate portion 29 at two points. Consequently, one end of the member 11 has a hook or projection 30, and the other end, a corresponding depression 31.

Figure 6:
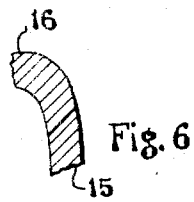
Figure 6 is a view taken substantially along the line VI—VI of Figure 2.
Figure 7:
Figure 7 is a view taken substantially along the line VII—VII of Figure 1.

The arcuate portion 29 of the split communicates at its outer end with one end of a circumferentially extending portion 32 (Figure 6) disposed in the sidewall 16, which is inclined laterally with respect to the sidewall. The other end of the portion 32 communicates with a portion 33 of the split, which extends diagonally through the curved section 16 of the flange.

When the transversely split member 11 is assembled with the endless ring 12, several factors enter into the maintenance of the ends of the member 11 in operative position. Primarily, the relative lateral movement of the ends of the member 11 is opposed by the interlocking ring disposed thereupon. However, if the ring does not prevent all relative lateral movement of the ends of the member, such other movement as might occur, is opposed positively by the frictional engagement of the ends of the member adjacent the portion 28 of the split. This frictional engagement is, of course, accentuated by the pressure of an inflated inner tube on the rim, which tends to contract the member 11 and thus strongly urges the ends against each other. In addition, the ends of the member have portions abutting along diagonal lines, which prevents relative lateral movement of the ends in one direction.

Outward radial movement of the ends of the member, relatively, is prevented initially by the ring 12, but such movement is positively prevented by the projection 30 in one end of the member 11 engaging the depression 31 in the other end. Moreover, since the portions 28 and 32 are slightly undercut, the ends of the member 11 adjacent these portions of the split serve to prevent their relative radial movement in one direction.

In the embodiment of the invention illustrated by Figure 8, the split in the member 11 comprises a diagonal portion 51, extending across the base 19 of the rim and identical with the portion 27 shown by Figure 1; a portion 52 extending normally through a portion of the base and through a portion of the sidewall 14 (see Figure 12), and a portion 53 extending diagonally through the curved portion 16 of the tire engaging flange. Preferably, this split is formed by shearing substantially radially through the base to form the portion 51 and the part of the portion 52 in the base of the member, and thereafter shearing substantially in a direction parallel to the axis of the rim, as indicated by the arrow A in Figure 13, thus forming the remainder of the portion 52 and the portion 53. Hence, in this construction, two operations are required to form the split.

The construction shown by Figure 9 is identical with that shown by Figure 8, with the exception that between the portions 52 and 53 of the split shown in the latter figure, a circumferentially extending portion 55 (Figure 12) is provided. The object of the portion 55 of the split is to assist in preventing relative radial movement of the ends of the member. Formation of the split in this construction is effected by the same method as that employed in forming the split illustrated by Figure 8.

From the foregoing description, it is apparent that a rim has been provided in which the transversely split member is positively maintained in its operative position. Consequently, when the rim is in operation, there is little chance of the parts becoming disassembled. Moreover, by forming the split in the manner described, the expense of manufacturing the rim is reduced to a minimum.

Although I have illustrated only the preferred forms which the invention may assume and have described those forms in detail, it will be apparent to those skilled in the art that the invention is not so limited but that various minor modifications may be made therein, without departing from the spirit of the invention or from the scope of the appended claims.

What I claim is:

1. A rim comprising a transversely split base portion having at one edge a tire engaging flange including a substantially radial, outwardly projecting portion and having at its other edge a gutter in which an endless side ring is disposed, the split in the base portion of the rim comprising a portion extending in a general diagonal direction across the base and including a portion extending in a direction substantially axially of the rim, and a hook portion extending laterally through the tire engaging flange.

2. A rim comprising a transversely split base portion having at one edge a tire engaging flange including a substantially radial, outwardly projecting portion terminating in a substantially laterally projecting portion, and having at its other edge a gutter in which an endless ring is disposed, the split in the base portion comprising a portion extending in a general diagonal direction across the base and including a portion extending in a direction substantially axially of the rim, a hook portion extending through the radial portion of the tire engaging flange, and a diagonal portion disposed in the laerally projecting portion of the tire engaging flange.

3. A rim comprising a transversely split base portion having at one edge a tire engaging flange projecting substantially radially and outwardly and having at its other edge a gutter in which an endless ring is disposed, the split base portion having a valve stem opening extending from a point substantially centrally of the base and through the gutter side thereof, the split in the base comprising a portion extending from the inner end of the valve stem opening to a point adjacent the tire engaging flange and including a portion extending in a direction substantially axially of the rim, and a hook portion extending through the tire engaging flange.

4. In combination a rim comprising a transversely split base portion having a gutter at one of its edges, and an endless side ring disposed in the gutter thereof, said split member having at its opposite edge a tire engaging flange comprising a substantially outwardly directed radial portion terminating in a laterally projecting portion, the split in the split member comprising a portion extending laterally across the base, a portion extending laterally through the laterally projecting portion of the tire engaging flange, and a curved portion in the side wall of the flange, said curved portion intersecting a radial plane at two points to provide a projection on one end of the member for disposition within a curved depression in the other end of the member.

5. A rim comprising a transversely split member having a gutter at one side, and an endless ring disposed in the gutter, said split member having a tire engaging flange at its other side comprising a substantially radial, outwardly directed portion terminating in a substantially laterally projecting portion, the split in the split member comprising a portion extending in a general diagonal direction across the base, a portion extending diagonally through the laterally projecting direction portion of the flange, and a hook portion in the side wall of the flange, said hook portion intersecting a radial plane at two points to provide a projection in one end of the member for disposition within a complementary depression in the other end of the member, said first portion of the split including a portion extending in a direction approximately axially of the rim, and a portion diagonal with respect to the rim axis.

6. A rim comprising a transversely split member having a gutter at one side, a substantially outwardly directed radial flange at its other side terminating in a laterally projecting portion, and an endless side ring disposed in the gutter, the split in the split member comprising a portion extending in a general diagonal direction across the base, a portion extending laterally through the laterally projecting portion of the flange, and a curved portion in the side wall of the flange communicating with the first mentioned portions of the split, said curved portion intersecting a radial plane at two points to provide a projection in one end of the member for disposition within a depression in the other end of the member, said first portion of the split including a portion extending in a direction approximately axially of the member.

7. A rim comprising a transversely split member having a gutter at one side and a substantially radially directed flange at its other side which terminates in a laterally projecting portion, and an endless side ring disposed in the gutter, said split member having a valve stem opening therein extending from a point substantially centrally of the member through the gutter portion thereof, the split in the split member comprising a portion extending laterally across the base from the inner end of the valve stem opening, another portion extending laterally through the laterally projecting portion of the flange, and a hook portion in the radial portion of the flange, said hook portion intersecting a radial plane at two points to provide a projection in one end of the member for disposition within a depression in the other end of the member.

8. A rim comprising a transversely split base member having a gutter at one side, a tire engaging flange at its other comprising a substantially radial, outwardly directed portion terminating in a laterally projecting portion, and an endless side ring disposed in the gutter, the split comprising a portion extending in a general diagonal direction across the base of the member and including a portion extending approximately axially of the member, and a portion in the flange extending first in a substantially circumferential direction and then diagonally through the laterally projecting portion of the flange.

9. A rim comprising a transversely split base member having at one side, a tire engaging flange and at its other a gutter in which an endless ring is disposed, the split in the base member including a valve stem opening extending from a point substantially centrally of the base and through a portion of the gutter, thereby in effect obviating a portion of the gutter.

10. A rim comprising a transversely split base member having a tire engaging flange at one side and a gutter at its other side, and an endless side ring disposed in the gutter, a portion of the split extending diagonally across the base member and including a portion extending in a direction approximately axially of the rim, and a portion extending through the tire engaging flange of the base member, the base member also having a valve stem opening extending through the gutter portion thereof and which communicates with the split and thereby in effect forms a part of the latter.

11. A transversely split rim member having a substantially radial flange at one edge, the split including a portion in the flange extending substantially circumferentially of the rim member, and the ends of the member defined by said portion of the split being directed at an angle to the axis of the rim.

In witness whereof, I have hereunto signed my name.

Signed at Akron, in the county of Summit, and State of Ohio, this 9th day of May, 1928.

ALVA W. WOODWARD.